Sept. 14, 1965  J. H. HOLSTEIN  3,206,347
LABEL APPLYING APPARATUS
Filed Feb. 25, 1963  8 Sheets-Sheet 1

JOHN H. HOLSTEIN
INVENTOR

Huebner & Worrel
ATTORNEYS

Sept. 14, 1965 J. H. HOLSTEIN 3,206,347

LABEL APPLYING APPARATUS

Filed Feb. 25, 1963 8 Sheets-Sheet 2

JOHN H. HOLSTEIN
INVENTOR

Huebner & Worrel
ATTORNEYS

Sept. 14, 1965  J. H. HOLSTEIN  3,206,347
LABEL APPLYING APPARATUS
Filed Feb. 25, 1963  8 Sheets-Sheet 3
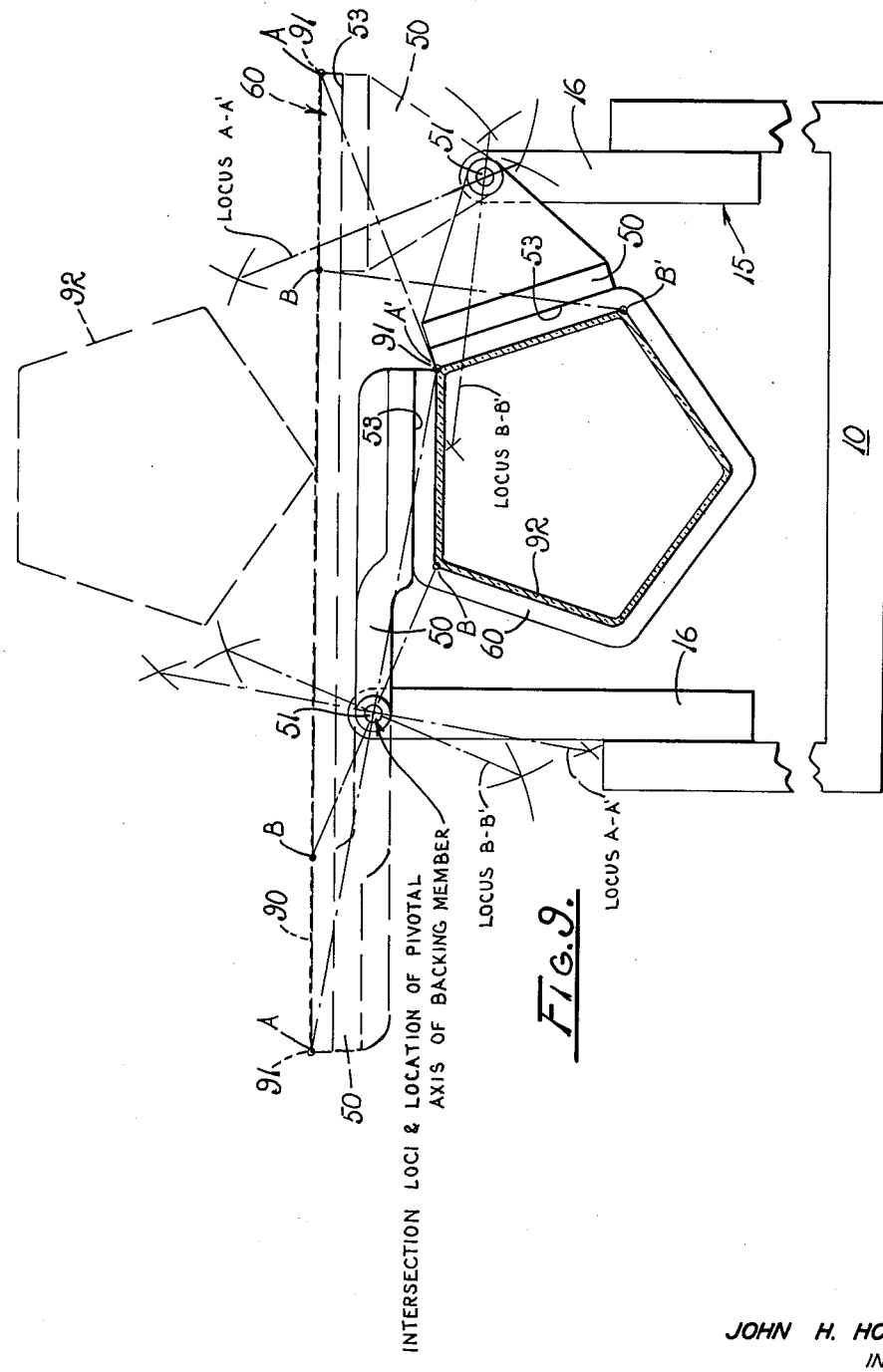
JOHN H. HOLSTEIN
INVENTOR
Huebner & Worrel
ATTORNEYS

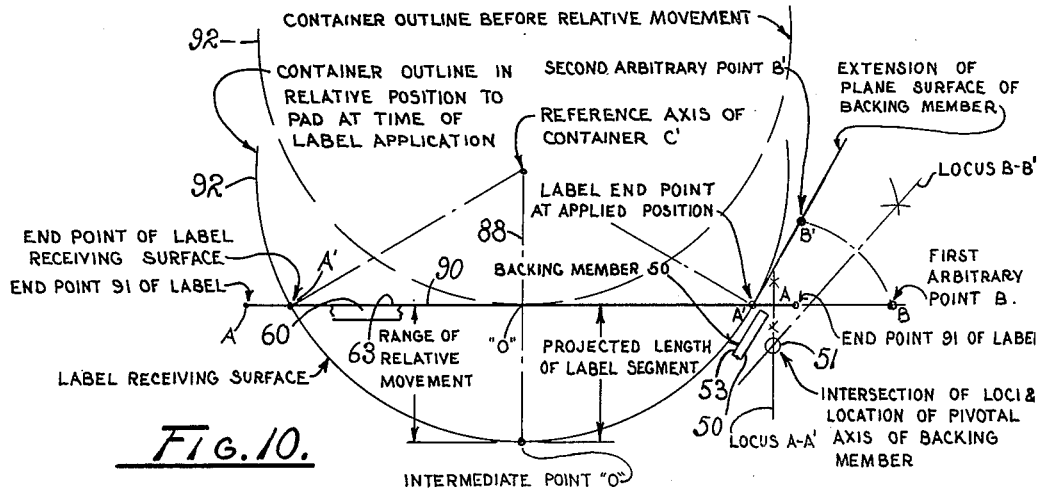
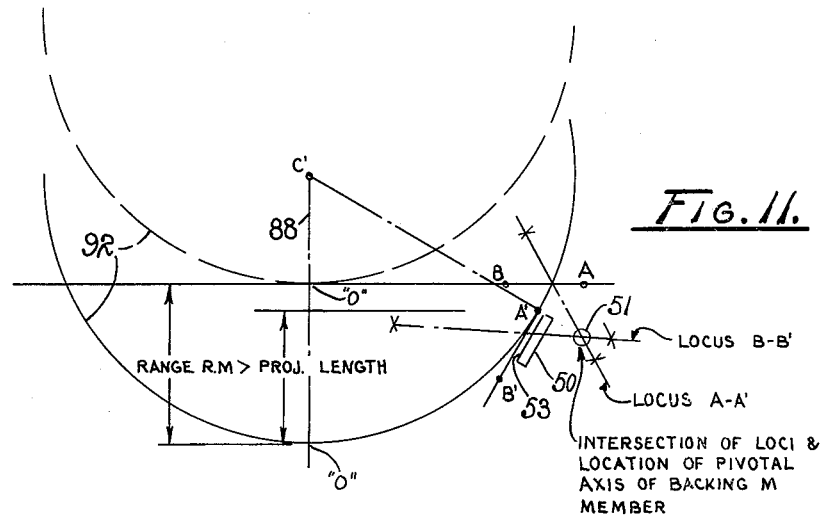
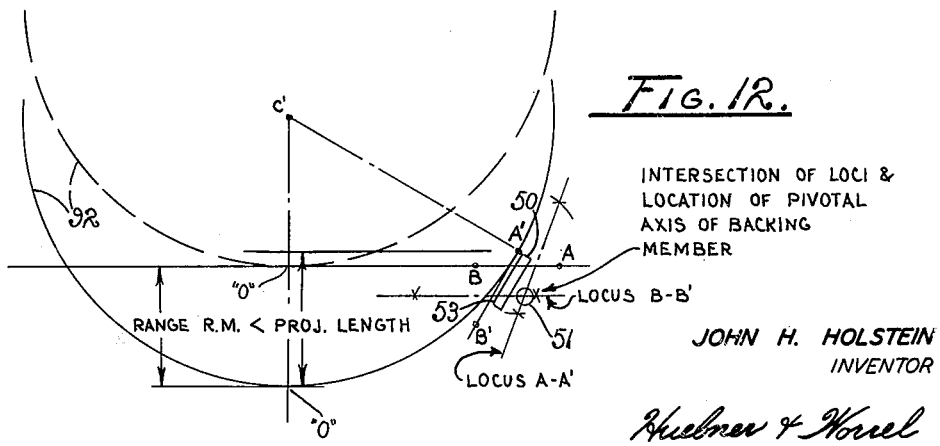

Sept. 14, 1965 J. H. HOLSTEIN 3,206,347
LABEL APPLYING APPARATUS
Filed Feb. 25, 1963 8 Sheets-Sheet 5

JOHN H. HOLSTEIN
INVENTOR
Huebner & Worrel
ATTORNEYS

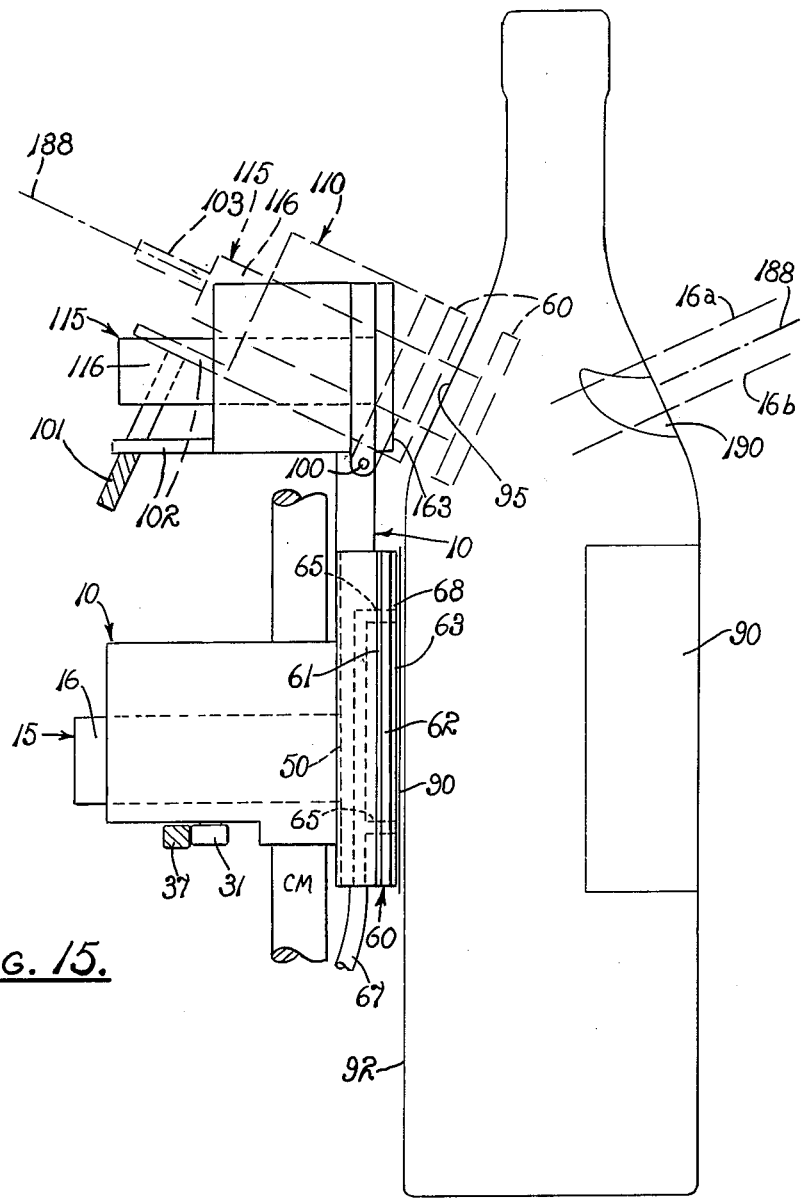

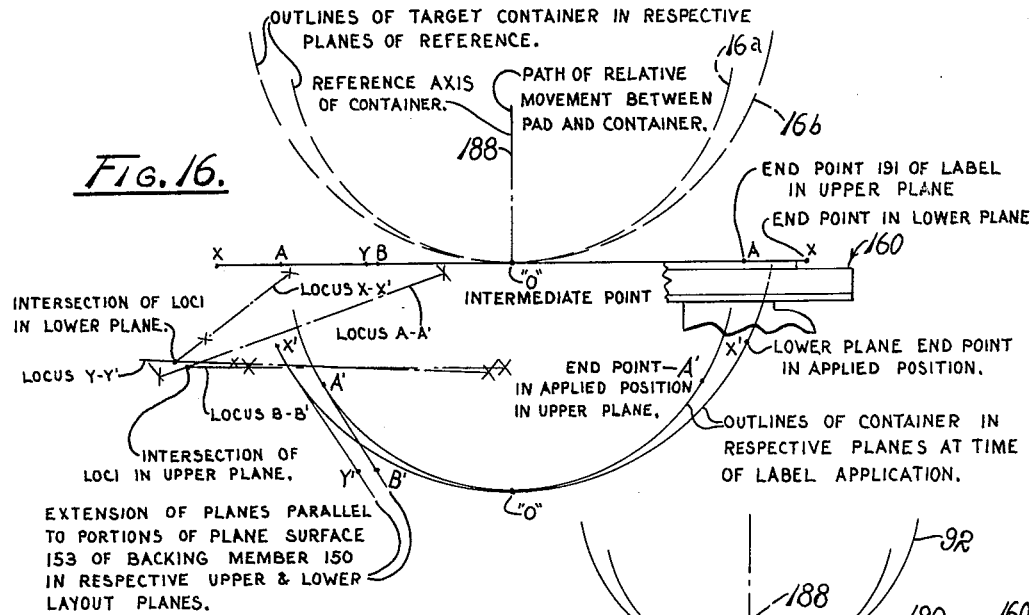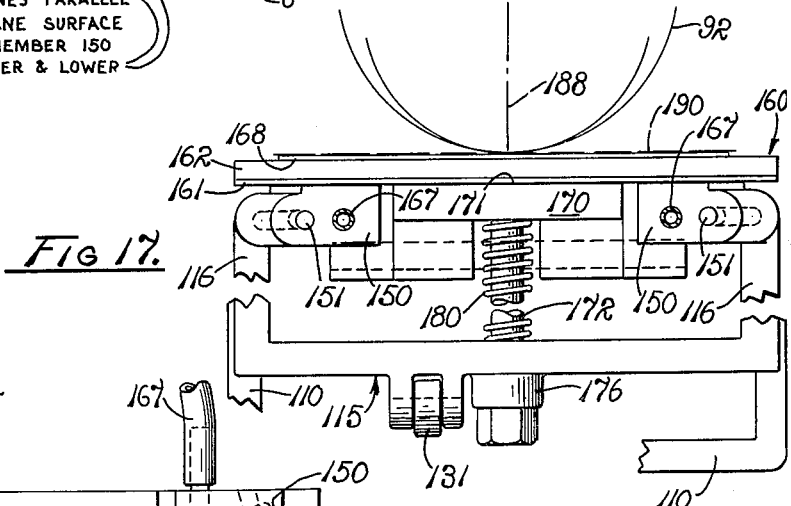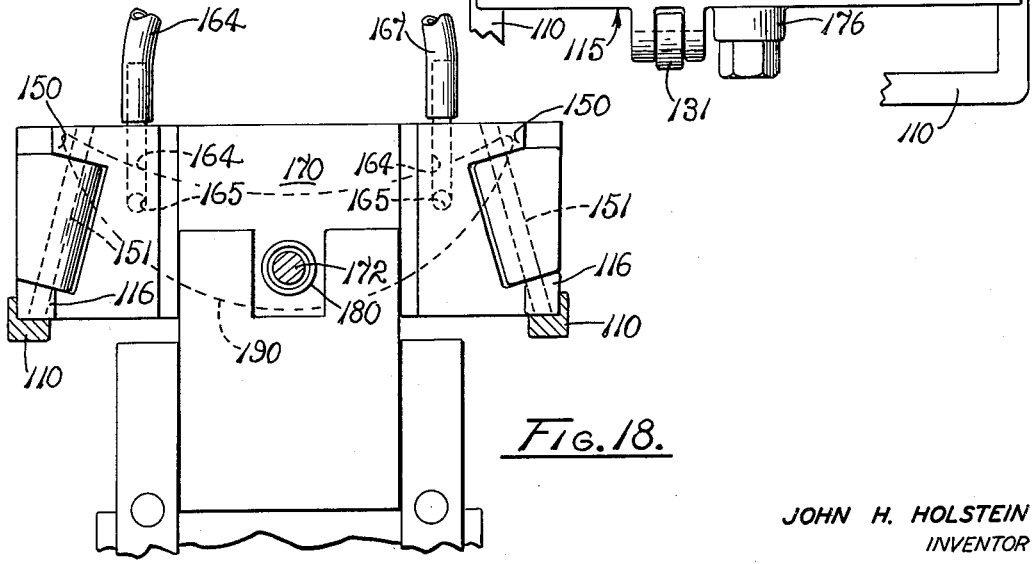

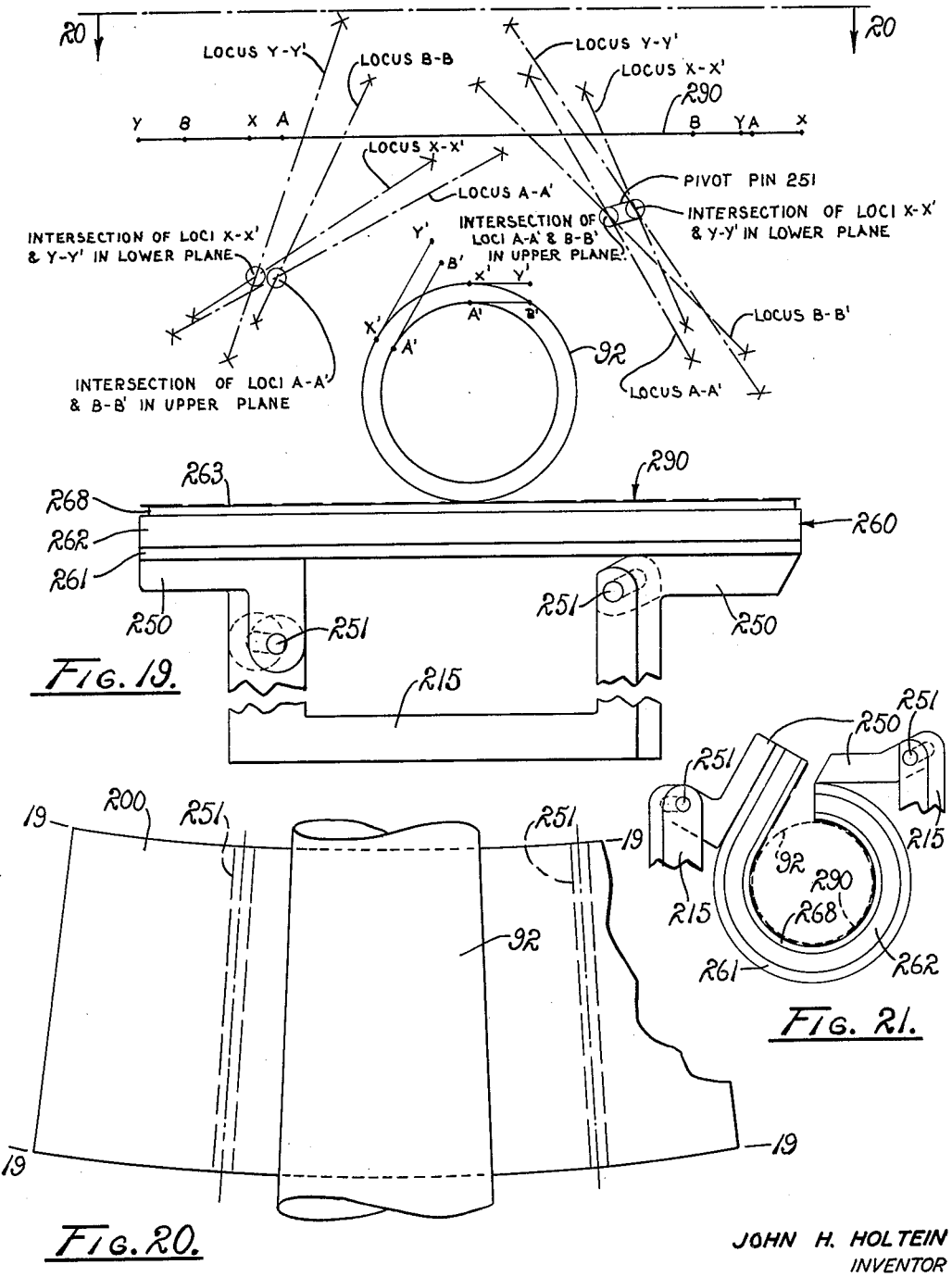

United States Patent Office 3,206,347
Patented Sept. 14, 1965

3,206,347
LABEL APPLYING APPARATUS
John H. Holstein, 404 E. Sussex Way, Fresno, Calif.
Filed Feb. 25, 1963, Ser. No. 260,752
19 Claims. (Cl. 156—476)

This invention relates to apparatus adapted to apply labels to containers, such as bottles, and the like. It particularly relates to a label applying head adapted to receive a label which is in a substantially flattened condition for convenient pick-up and subsequently to apply the label to a receiving surface which departs substantially from the shape of the label at the time of pick-up while minimizing or preventing relative movement between the receiving surface and the label during the application thereof other than that nomal to the receiving surface required to bring the label into place.

Prior to the present invention, the application of labels formed from pliable materials, primarily paper, to individual containers has presented a major problem to the foodstuff and beverage processing and packaging industry. This is particularly true in connection with the use of containers which present a curved, smooth label receiving surface having a low coefficient of friction, such as glass bottles, and the like. The problem is further aggravated when the label is of a length less than the peripheral dimensions of the container and the label is to be located accurately thereon.

In the past, the major portion of such labels has been applied manually. Such a method is quite tedious to personnel employed for such duties, and labels applied manually incur high unit labor cost for such application. In addition to being tedious and uneconomical, a manual method of label application does not permit the maximum utilization of completely automated food and beverage processing machinery.

Previously known mechanisms for applying individual labels to containers have been found incapable of accurately applying a label to the surface of a container while the container is being moved along a substantially rectilinear or circular path through a processing machine, or between successive machines in the overall processing operation. Another shortcoming of previously known label applying apparatus has been relative movement between the label and the surface of the container to which it is being applied which causes glue streaks and smeared areas on the container. This is particularly objectionable in the case of glass bottles which have been selected as packaging containers clearly to display the characteristics of their contents. In addition, previously known label applying mechanisms have not been readily adaptable to a plurality of container sizes and configurations and have been found to be incapable of simultaneously applying several labels to a single container.

Accordingly, it is an object of the present invention to provide a label applying apparatus which is capable of accurately and dependably applying a label to the peripheral surface of a container.

Another object is to provide a label applying apparatus which minimizes or precludes relative movement between the container and the label during application thereof.

Another object is to provide a label applying apparatus which is readily adaptable to a variety of container sizes and configurations.

Another object is to provide a label applying head ideally suited for use in the automated labeling of containers and adapted simultaneously to apply two or more labels to a single container.

Another object is to provide a label applying apparatus which is capable of applying to a container a label of any predetermined length which is either less than or substantially equal to the peripheral length of the label receiving surface afforded by the container.

Another object is to provide a label applying apparatus which is readily adapted to affix a label to a target container affording a label receiving surface of a peripheral length less than the label, such a label extending about the peripheral surface a distance greater than 360°, and being known as a "wrap-around" label.

A further object of the invention is to provide a label applying head capable of affixing, by means of a suitable adhesive, a conformable label to a container upon relative rectilinear movement between the head and the container while minimizing or precluding deposition of extra and undesirable adhesive to the container surface.

A still further object is to provide a label applying head capable of applying an adhesive bearing label to a container of a selected size and configuration while minimizing or preventing slippage or relative movement between the label and the container regardless of the relative length of the label and the configuration of the container.

These, together with other objects, will become more fully apparent upon reference to the following description and accompanying drawings.

In the drawings:

FIG. 9 is a view similar to FIG. 8 showing a label applying apparatus embodying the principles of the present invention and adapted to apply a label to a container having a non-cylindrical, polygonal label receiving surface.

FIG. 10 is a diagrammatic illustration of the relative positions of a label applying pad employed in a label applying head embodying the principles of the present invention and the surface of a container to which a label is to be applied. This figure illustrates the method employed in locating the respective pivotal axes for a pair of laterally opposed backing members for the label pad thereby to adapt the label applying head for applying a label to a container with a minimum or no relative slippage therebetween upon relative rectilinear movement between the container and the head, the range of such relative movement being substantially equal to the projected length of the label in an applied position and measured on the path of relative movement.

FIG. 11 is similar to FIG. 10 but showing the location of the pivotal axes for the pad backing members when the range of relative movement is greater than the projected length of the label in an applied position.

FIG. 12 is similar to FIGS. 10 and 11 showing the location of the pivotal axes when the range of relative movement between the container and the label pad is less than the projected length of the label in an applied position.

Figure 13:
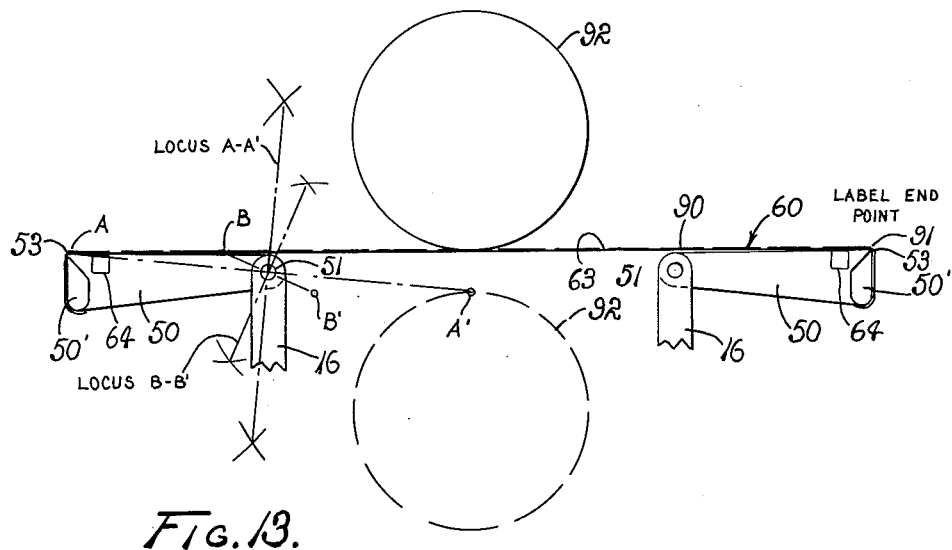

FIG. 13 is a fragmentary, somewhat diagrammatic, view showing another form of the invention with the label applying head at the initial point of contact with a container, the label supporting pad being in a label receiving position. The container is shown in dashed lines to represent the relative positions of the applying head and container subsequent to relative rectilinear movement therebetween.

Figure 14:
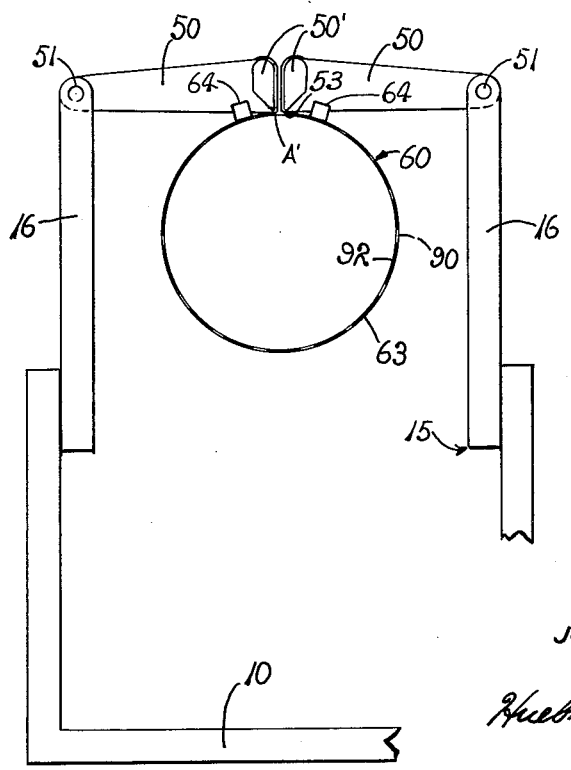

FIG. 14 is a view similar to FIG. 13 and showing the label applying head in a position to apply a label to the container shown in FIG. 13.

FIG. 15 is a schematic illustration of a label applying head employing two pads supported by backing members pivotally mounted in accordance with the principles of the present invention thereby to adapt the label applying head simultaneously to apply two labels to a container such as a bottle as illustrated, wherein the pads must move in relative rectilinear paths relative to the bottle, the respective paths being inclined relative to each other. An upper label, known as a shoulder label and a main, or lower, label known as a face label are shown affixed to the bottle; however, both of these labels are illustrated on a side of the bottle opposite from the label applying head. The labels are so illustrated for the purposes of clarity, it being understood that each label normally is affixed on that side of the bottle contacted by the respective label applying pads of the applying head.

FIG. 16 is a composite, diagrammatic illustration of the upper label applying pad employed in the applying head of FIG. 15 in both label receiving and label applying positions relative to the label receiving surface afforded by the bottle for the upper or shoulder label, the planes of this composite illustration being taken in the respective upper and lower planes parallel to each other and indicated by the lines 16a and 16b in FIG. 15 and represented in the composite illustration in overlying, but coplanar, relationship.

FIG. 17 is a top plan view of the upper label applying pad of FIG. 15 when in a position of initial contact with the bottle and just prior to moving to a label applying position. This figure is viewed from a position superior to the planes 16a and 16b in FIG. 15 and looking in a direction substantially normal to those planes.

FIG. 18 is a view in rear elevation of the label applying pad of FIG. 17.

FIG. 19 is a fragmentary, top plan view of label applying apparatus adapted to apply a label to the periphery of the tapered neck of the container then the target container, such as a bottle, wherein the length of the label is greater than the length of the label receiving surface afforded by the container measured about the periphery thereof. This figure is also a composite diagrammatic illustration showing the relative positions of the label applying pad and the container both before and after relative movement therebetween so as to urge the label into contact with the container. This composite schematic view is taken in parallel overlying planes, indicated by the upper and lower lines 19—19 in FIG. 20 and shown in a coplanar relationship.

FIG. 20 is a fragmentary view in rear elevation of the apparatus of FIG. 19 taken from a position indicated by the line 20—20 of FIG. 19.

FIG. 21 is a fragmentary top plan view of the apparatus of FIG. 19 shown in a label applying position.

Referring in greater particularity to FIGS. 1 through 5, an applicator head embodying the principles of the present invention is shown as employing a U-shaped support frame 10 which serves as a mounting bracket to adapt the label applying head for selective elevational positioning on a carrier mast fragmentarily illustrated and including a pair of parallel carrier mast rods designated as CM. The U-shaped support frame 10 includes a pair of laterally opposed concave mounting lugs 11 adapted to receive a respective one of the carrier mast rods. At least one of the mounting lugs 11 is provided with a set-screw 12 to permit elevational adjustment of the label applying head on the carrier mast. The carrier mast and supporting structure therefor is shown in detail in my co-pending application entitled "Label Applying Mechanism" filed concurrently herewith, and assigned Serial No. 260,801. Suitable conveyor mechanism is disclosed in that application to transport a plurality of containers, such as bottles, along a path of movement through a label applying station. Transport means is also provided to motivate the carrier mast, on which the present label applying head is supported, along a path, a portion of which is parallel and closely adjacent to the path of the containers. Means, such as a cam subsequently to be described, is also provided to effect relative rectilinear motion between the container and the label supporting portion of the label applying head illustrated.

Figure 1:
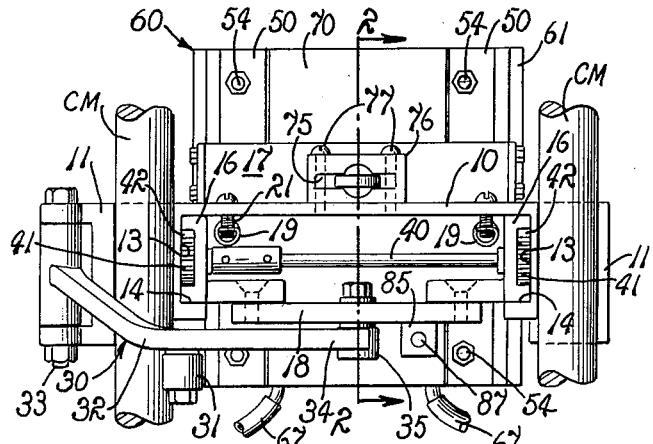
FIG. 1 is a rear elevation of a label applying apparatus embodying the principles of the present invention.
Figure 2:
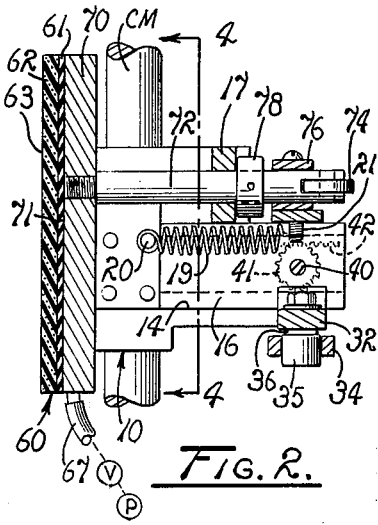
FIG. 2 is a vertical, transverse section of the label applying head of FIG. 1 taken on line 2—2 of that figure.
Figure 3:
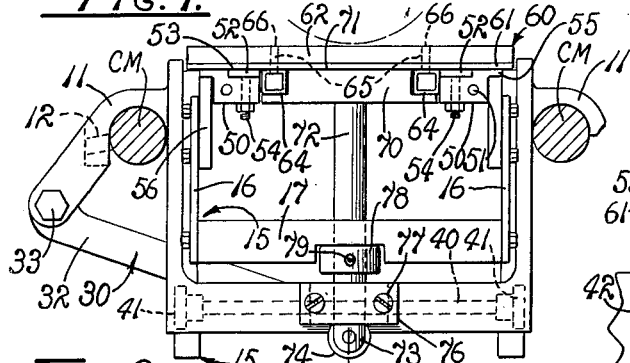
FIG. 3 is a top plan view of the label applying head of FIG. 1 shown in a label receiving position and a container fragmentarily schematically illustrated in a position to receive the label.
Figure 4:
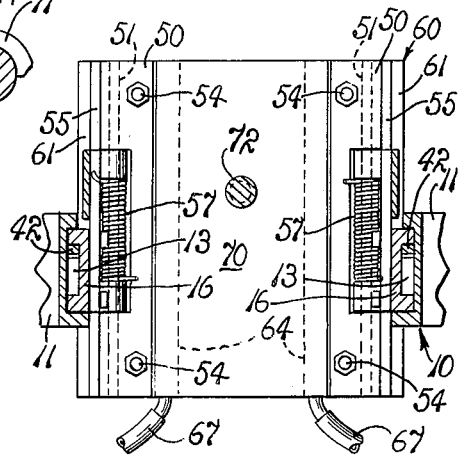
FIG. 4 is a view in vertical, transverse section taken in a plane represented by the line 4—4 in FIG. 2.
Figure 5:
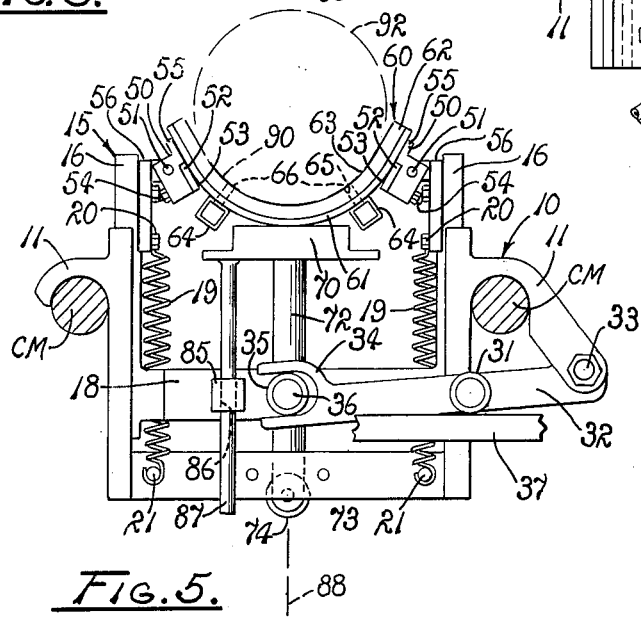
FIG. 5 is a bottom plan view of the label applying head and container of FIG. 3 being shown in an extended label applying position.

The support frame 10 is provided with laterally opposed parallel channels 13 which define a path for rectilinear movement substantially normal to the plane of the carrier mast CM. Each of the channels provides bearing surfaces 14 slidably to support a carriage, generally indicated at 15. The carriage includes a pair of laterally opposed slide arms 16 interconnected at one end by upper and lower cross members 17 and 18. Each of a pair of retraction springs 19 is interconnected between anchorages 20 and 21 provided respectively on each of the arms 16 and the frame 10. The springs 19 provide a biasing force to urge the carriage 15 toward a retracted label receiving position, which is shown in FIG. 3. The carriage 15 may also be considered a supporting bracket for the label applying pad subsequently to be described. The carriage 15 or support bracket is mounted in the frame 10 for movement along a path of travel between a retracted label receiving position and an extended label applying position.

To effect rectilinear movement of the carriage arms 16 along the respective paths of movement defined by the opposed channels 13, a cam follower linkage, generally indicated at 30, is operatively associated with the carriage 15. This cam follower linkage comprises a cam follower 31 rotatably carried by a lever arm 32 having its proximal end pivotally mounted on the frame 10 as by a pin 33. The free end of the lever 32 terminates in a bifurcated yoke 34. The yoke receives a drive bushing 35 rotatably mounted on a stub shaft 36 fixed to the lower cross member 18. A cam fragmentarily illustrated at 37 is fixedly positioned to effect movement of the cam follower linkage 30. Consequently, the carriage 15 is moved from the label receiving position shown in FIG. 3 to a label applying position shown in FIG. 5, upon appropriate relative movement between the cam 37 and the label applying head. An example of such relative movement is described in detail in my aforementioned co-pending application, wherein the cam 37 is rigidly supported on a frame structure and transport mechanism is provided to motivate the carrier mast CM and the label applying head in a path of movement past the cam 37.

To insure synchronized motion of the opposed arms 16 during movement to and from the label receiving and label applying positions, a synchronizing mechanism is provided in the carrriage 15. The synchronizing mechanism comprises a transversely extended shaft 40 rotatably mounted at opposite ends in the arms 16 and rigidly carrying a pinion gear 41 at each of the opposite ends. Each of the pinion gears is in mesh with a respective one of a pair of rack bars 42 secured to the frame 10.

At the forward or label receiving end of the frame 10, a pair of laterally opposed backing members 50 is provided. Each of the backing members 50 is secured to a respective one of the arms 16 by a respective pivot pin 51. The pins 51 are precisely located to provide respective pivotal axes for the backing members 50. The method of so precisely locating these axes will be described subsequently in detail. Each of the backing members 50 includes a substantially flat, elongated pad attachment block 52, each provided with a plane surface of reference 53 and rigidly secured to a respective backing member by means of retaining bolts 54. Accordingly, by a respective one of the pad attachment blocks 52, each of the backing members 50 affords a plane surface of reference. The lateral extent of the plane surface of reference 53 need not be greatly extended, and in certain cases can be extremely short. For the purposes of specification and claim terminology, the plane surface of reference 53 could constitute a tangent to a curvilinear surface. Even though the tangent is of an extremely finite length, it can serve as a plane surface of reference in precisely locating the pivotal axes provided by the pivot pins 51. The precise location of these pivotal axes is quite important to minimize or to preclude relative movement between the container and the label during the application thereof to the container surface. To insure that the plane surface of reference 53 of each of the backing members 50 lies in a single plane when the carriage 15 is in a label receiving position, each of the backing members is provided with a laterally projecting flange 55 adapted to engage a stop 56 fixed to each of the arms 16. The backing members 50 are biased to a label receiving position by means of individual torsional springs 57.

An applicator pad, generally indicated at 60, is mounted on the backing members 50 in interconnecting relation therebetween. The pad is adapted to conform to the label receiving surface provided by the container, and as shown in detail in FIG. 2, includes a sheet of homogeneous impermeable, pliable material 61 which is heat bonded to each of the pad attachment blocks 52. A resilient conforming pad 62 of closed-cell elastomer material is joined to the sheet 61 by means of a suitable adhesive and provides a label supporting face 63. Since the closed-cell pad 62 would be subjected to expansion at a differential rate throughout its thickness if heat bonded directly to the pad attachment blocks, the homogeneous impermeable sheet 61 is ideally suited for heat bonding to the blocks and for serving as a base in cementing the pad 62 thereto.

Two laterally opposed vacuum conduits 64 are also bonded to the impermeable sheet 61 and are in pneumatic communication with a plurality of passageways 65 extended through the thickness of the applicator pad 60. The passageways 65 terminate in apertures 66 at the label supporting face 63 of the pad. Individual hoses 67 connected respectively to the conduits 64 establish communication between the apertures 66 and a source of vacuum schematically illustrated at P. The pneumatic system more fully disclosed in the aforementioned co-pending application satisfactorily serves as a source of vacuum. The source of vacuum P is selectively placed in communication with the apertures 66 by a suitable valve, indicated at V. Valve control means, such as the cams and cam followers illustrated in the above mentioned co-pending application adequately serve in effecting appropriate movement of the valve V selectively to provide an approximate vacuum in the passageways 65 and at the label face apertures 66.

A substantially flat backing block 70 affording a plane surface 71 is supported in the carriage 15 by means of a push rod 72 longitudinally extended substantially normal to the surface 71. The rod 72 provides a distal end 73 carrying a cam follower 74, both of which are received in a slide way 75 complementarily formed in a bearing block 76. The bearing block is rigidly fixed to the frame 10 by means of screws 77. An annular stop collar 78 encompasses the rod 72 and is adjustably longitudinally positioned thereon by means of a setscrew 79. The stop collar 78 is adapted to engage the upper cross member 17 of the carriage 15.

A bearing block 85 is rigidly secured to the lower cross member 18 and provided with a pilot passageway 86 to receive a longitudinally extended guide rod 87. One end of the rod 87 is fixed to the backing block 70 and in conjunction with the pilot passageway 86 insures maintenance of the surface 71 in a plane substantially normal to the path of movement of the label pad as determined by the channels 13.

Operation

The operation of the described embodiment of the subject invention is believed to be readily apparent and is briefly summarized at this point.

A supply of suitable labels of thin pliant material, such as paper and the like, is provided and suitable issuing means, not shown, is associated with the label supply means to deposit a single label upon the surface of the label supporting face 63 when in a position as shown in FIG. 3. In this position, the label supporting face lies in a single plane and facilitates reception of a label in a flattened condition. Satisfactory label supply and issuing means are illustrated in my aforementioned co-pending application. Simultaneously upon the deposition of a label on the supporting face 63, the source of vacuum schematically indicated at P is placed in communication with the passageways 65 in the label pad to provide an air pressure at the apertures 66 less than environmental atmospheric pressure. Suitable valve control mechanism for the valve V is shown in the aforementioned application to effect appropriately timed movements of the valve. Accordingly, the differential air pressure exerted against the exposed side of the label, due to the relative vacuum existing at the aperture 66, is effective to maintain the label in a predetermined location on the face 63.

The aforementioned transport mechanism motivates the carrier masts CM past a suitable adhesive activation station, not shown, to render the exposed side of the label adherent. In a commercial embodiment of the invention, the adhesive activation station comprises a glue roll to deposit a film of glue, or other adhesive, to the exposed, underside of the label. Other means suitable to render the underside of the label adherent is a moistening apparatus for pre-gummed labels, or a heating device in the event a thermoplastic label or adhesive is used. Subsequent to the underside of the label being rendered adherent, the transport mechanism is then utilized to advance the label applicator head to an appropriate position relative to the container to which the label is to be applied. Appropriate relative positions of the container and the head are shown in FIG. 3. Assuming that the portion of the container to which the label is to be applied is in the form of a right cylinder, the fragmentary circle shown in FIG. 3 is representative of the outline of the container and its position relative to the label applying pad prior to relative rectilinear movement of the pad toward the container. This relative rectilinear movement occurs during movement of the pad from the label receiving position shown in FIG. 3 to the label applying position shown in FIG. 5. This rectilinear movement is effected by means of relative movement between the cam 37 and the cam follower mechanism, generally indicated at 30. Such relative movement effects movement of the carriage 15 toward the container; this movement is upwardly as viewed in FIG. 5. During such movement, the backing block 70 which serves merely to maintain the label receiving face 63 in a single plane during reception of the label and the rendering of the underside adherent, remains in its previous position and is stationary relative to the container. During the movement of the applicator pad 60 from the label receiving position shown in FIG. 3 to the label applying position shown in FIG. 5, relative movement occurs between the container and pad along a path of movement schematically indicated by the dashed line 88. The range of relative movement along the path 88 must be of sufficient magnitude to effect intimate contact of the adherent underside of the label with the label receiving surface afforded by a container. The range of this movement may be less than the projected length of the label on the path of relative movement, or may be substantially equal to such projected length, or may exceed the projected length. The location of the pivotal axes for the backing members 50 which afford the plane surface of reference 53 must be precisely located to accommodate a given range of movement.

Figure 6:
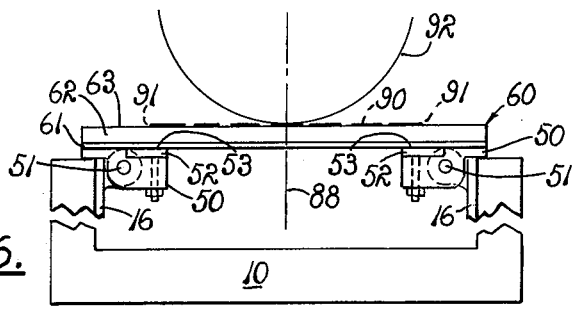
FIG. 6 is a fragmentary, somewhat diagrammatic view showing the relative positions of the label applying head of FIG. 3 at the initial point of contact with a container, the label supporting pad being in a label receiving position.
Figure 7:
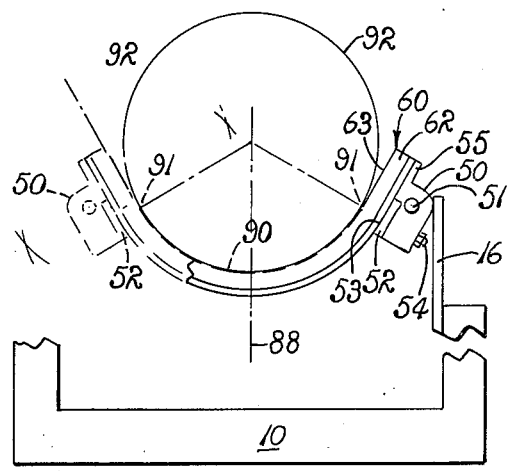
FIG. 7 is similar to FIG. 6 except that the container and the label applying head are shown in their relative positions upon the completion of relative rectilinear movement therebetween of sufficient magnitude to move the head to a label applying position.
Figure 8:
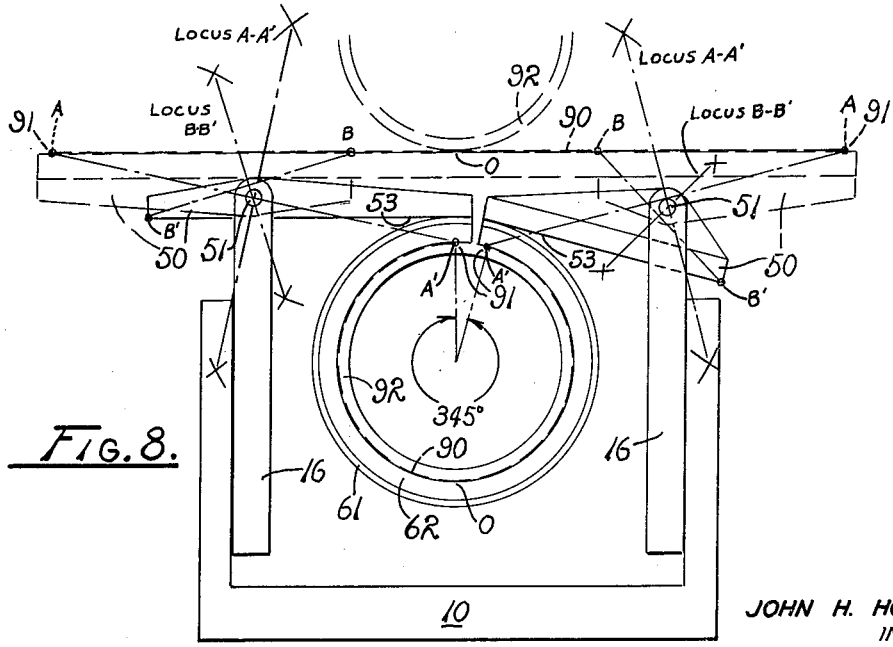
FIG. 8 is a composite schematic view incorporating both of the positions of FIG. 6 and FIG. 7 and schematically illustrating a label applying apparatus adapted to apply a label to a container wherein the label is of a length substantially equal to the peripheral length of the label receiving surface of the container.

By referring to FIGS. 6, 7 and 8, the requisite precise location of the pivotal axes for the backing members 50 and the range of relative movement between the pad 60 and the container will be more readily apparent. In FIG. 6, a label 90 is shown as having opposite ends 91 and as supported on the label receiving face 63 of the pad 60. A container 92 is shown in outline form as having a circular configuration in horizontal transverse section, the main portion of the container which affords the label receiving surface being in the form of a right cylinder. The radius of the symmetrical container is illustrated as having a single unit of length, such as for instance, one inch. By way of example, the label receiving surface of the container extends throughout an arc of one hundred and twenty degrees measured about the circular periphery of the container 92. Accordingly, the length of the label 90 measured from its opposite ends 91 must correspond to the peripheral distance between the limits of the label receiving surface. Stated differently, the length of the label must be 2,094 (⅓ pi×2) times the single unit length of the radius. By precisely locating the pivotal axes for the backing members 50, it is possible to apply the label of such a length to a predetermined label receiving surface by relative rectilinear movement between the pad 60 and container 92.

Following relative movement of the applicator pad 60 toward the container 92 throughout a range of sufficient magnitude to effect intimate contact between the label 90 and the label receiving surface of the container, the ends 91 of the label must necessarily overlie the predetermined limits of the label receiving surface of the container. Also, the pad 60 must be capable of conforming to the configuration of the label receiving surface. To permit such conformation, the backing members 50 each must pivot about their respective pivotal axes provided by the pins 51 in such a manner that at the termination of relative movement between the pad 60 and the container 92 and when the pad is in a label applying position, the plane surface of reference 53 must be substantially parallel to a plane surface tangent to the label receiving surface at the endward limit 91 of the label. This is an absolute requirement for the linkage and backing members to preclude shifting of the label once contact with the container has been made. If the container is a transparent glass bottle, shifting between the label and the bottle surface will because a smearing of the adhesive on that surface and thereby detract from the appearance of the labeled container. It will be observed by comparing FIGS. 6 and 7 that this particular embodiment of the invention provides a range of relative movement between the pad 60 and the container 92 which is substantially greater than the length of the label when projected on the path of relative movement 88 passing through the central axis of the container 92. Throughout the remainder of the specification and claims, the term projected length of the label will mean the length of the label in an applied position on the label receiving surface of the container projected on a plane passing through the central axis of the container and parallel to the path of movement occurring between the pad 60 and the container 92.

FIG. 8 illustrates diagrammatically the locations of the pivotal axes of the backing members 50 in a label applicator head embodying the principles of the present invention and employed in applying a label of a length substantially equal to the peripheral length of the container 92. The container 92 is again diagrammatically illustrated in cross-section as having the configuration of a right cylinder of unit radius. Accordingly, the peripheral distance around the external surface of the container will be twice the value of pi, or 6.2832 units of length selected. To illustrate the adaptability of the present invention to labels of different length, the label length has been arbitrarily selected as that sufficient to cover an arc of three hundred forty-five degrees of the peripheral surface of the container. Accordingly, when measured from an intermediate point O, which lies on the path of relative movement 88, the left side of the label, as viewed in FIG. 8, is used in covering one-half of the circumferential extent of the label receiving surface and is 3.1416 units of length; the right side of the label, as viewed in FIG. 8, is of a length sufficient to cover one hundred and sixty-five degrees of the circumferential extent of the label receiving surface and is 3.009 units in length. By appropriately determining and locating precisely the pivot axes for the pivot pins 51 which support the backing members 50 on the movable carriage, the pad 60 on which is supported the label 90, is adapted to be urged into intimate, conforming contact with the peripheral label receiving surface of the container 92 and to apply the label to that surface without shifting or relative movement between the label and the container once contact is made therebetween. The method of locating these pivotal axes will be described subsequently in connection with FIGS. 10, 11 and 12.

FIG. 9 illustrates the adaptability of the invention to another container configuration and label length. A container having a label receiving surface in the configuration of a pentagon is shown in dash lines at 92 prior to movement relative to a pad 60, also shown in dash lines and in a label receiving position. Supported on the pad is a label 90 of a length substantially equal to the peripheral extent of the container 92. The pad 60 is shown in solid lines as being in a label applying position following rectilinear movement relative to the container. For purposes of illustration, the container 92 has been moved from the position shown in dash lines. In a commercial embodiment of the invention, the pad 60 is moved rectilinearly while the container remains stationary with respect to the path of movement of the pad. Accordingly, precise application is made of the label 90 to the container 92. Such precise application is effected by reason of the location of the pivotal axes of the backing members 50 which permits conformance of the pad 60 to the pentagon-shaped container 92 without slippage or relative movement between the label and the container during label application. It should be noted that backing members 50 are each provided with a plane surface of reference 53, and that when in a label applying position, is parallel to the respective adjacent plane portions of the label receiving surface. The significance of the loci A—A′ and B—B′ will be explained below in conjunction with FIGS. 10, 11 and 12.

In FIG. 10, an outline of a container 92 is shown diagrammatically in dash lines to indicate the position of the container prior to relative movement between the container and a label pad fragmentarily shown at 60. The container is shown diagrammatically by a solid line in a position after relative movement has occurred between the container and the label pad as discussed above. In FIG. 10, the range of relative movement between the container and pad along the path of movement indicated by the line 88 is substantially equal to the projected length of the label, when the label is in an applied position on the label receiving surface of the container 92. Portions of the applicator head structure not necessary to an understanding of the method of locating the pivotal axes for the backing members 50 are omitted from FIG. 10 for purposes of clarity. Appropriate legends are provided for elements shown diagrammatically.

The diagrammatic illustration of FIG. 10 employs a reference scale twice that of FIGS. 6, 7, and 8; however, the circumferential length of the label receiving surface is the same as that in FIGS. 6 and 7, i.e., 120° of the circumference of the container. The method employed in locating each pivotal axis for the pivot pins 51 supporting the backing members 50 on the arm 16 of the carriage 15 is first to show the label supported on the label receiving surface 63 and lying in a single plane. The label end points are indicated at 91 when the label is supported in such a planar position. The container 92 is then moved diagrammatically relative to the label, the range of movement being substantially equal to the projected length of the label when in an applied position. The intermediate point of both the label receiving surface of the container 92 and of the label 90 is indicated by the letter "O." The label end point in an applied position as well as the corresponding end point of the label receiving surface is indicated by the letter "A'." Since the label end point must necessarily overlie the corresponding end point of the label receiving surface, the same symbol will suffice for both of these end points. A corresponding label end point of the label when supported on the surface 63 in a planar condition, is indicated by the letter "A." This corresponds to the label end point indicated by the numeral 91 in the other figures of the drawings. The locus of points is then determined equidistant from a respective one of the end points of the label receiving pad when the container is located relative to the label applying head with the arms in an extended label applying position and the pad is in conforming configuration to the label receiving surface of the container and the same end point of the label in a location when the pad is in a plane label receiving configuration with the arms 16 moved to a retracted label receiving position. In FIG. 10, this locus of points is labeled locus A—A', and represents the locus of points equidistant from the end point A' of the label in an applied position and the end point A of that same label when the pad is in a plane label receiving configuration and the arms 16 of the carriage 15 are in a retracted label receiving position. A second locus of points is then determined which is a locus equidistant from a pair of arbitrarily located points using the points A and A' as reference points and the plane of surface 53 as a plane surface of reference when the label applying apparatus is in a label applying position. The first arbitrary point is indicated by the letter "B" and is spaced at a predetermined rectilinear distance in a predetermined direction, which, in FIG. 10, is remote from the label end point A and spaced further from the intermediate point O. Accordingly, the first arbitrary point B is spaced a predetermined distance from a respective one of the end points of the label when supported on the pad 60 in a label receiving configuration. The second arbitrary point indicated at "B'" is spaced from that same end point of the label when it is in intimate contact with the container 92 and the pad 60 is in a label applying position. The spacing of the second arbitrary point B' from the label end point A' is also at that same predetermined rectilinear distance and in the same direction, i.e., remote from the label end point and at a distance from the intermediate point O greater than that of the label end point. A second condition which must be satisfied by the second arbitrary point B' is that it must lie in a plane parallel to the plane surface of reference 53 of the respective backing member 50 adjacent to that same label end point A' when the backing member 50 is in a label applying position. The backing member is shown diagrammatically and fragmentarily as being adjacent to the label end point A' when in an applied position and the surface of reference 53 is shown as being parallel to a plane tangent to the surface of the right cylinder at the label end point A'. Accordingly, the second arbitrary point B' lies in a plane parallel to the plane surface of reference 53 of the backing member 50 when in a label applying position. The locus of the arbitrary points B and B' is indicated in FIG. 10 by the legend "Locus B–B'." By locating the pivotal axes of the backing member at the intersection of the loci A–A' and B–B', each backing member 50 is capable of supporting one end of a flexible pad 60 and of urging a label held thereon into intimate contact with the label receiving surface 92 while precluding the possibility of any relative motion between the label and that label receiving surface during the application of the label thereto.

FIG. 11 is a diagrammatic illustration of the location of the pivotal axes for the backing members 50, only one of the pivotal axes being shown, the left side of the figure being a mirror image of the right side, assuming that the label is to be symmetrically disposed in relation to the intermediate point O. FIG. 11 illustrates the location of the pivotal axes at the intersection of the loci A–A' and B–B' when the range of relative movement along the path 88 between the container 92 and the label pad 60 is greater than the projected length of the label in an applied position on that path. Stated differently, the path of movement is substantially parallel to a radial plane extending from the axis of reference of the container, and may be considered a radial plane passing through the intermediate point O in the case of a right cylindrical container. Also, FIG. 11 differs from FIG. 10 in that the first and second arbitrary points, B and B', are located closer to the intermediate point O than are the label end point positions indicated at A and A'.

FIG. 12 is similar to FIGS. 10 and 11, with the exception that the range of relative movement between the container 92 and the pad 60 is shown diagrammatically as less than the projected length of the label 90 when in an applied position on the label receiving surface of the container. Also, the arbitrary points B and B' are located closer to the intermediate point O than are the label end point positions indicated at A and A'.

FIGS. 13 and 14 are similar to FIGS. 9, 10, 11 and 12, and illustrate the invention wherein the backing members 50 have a plane surface of reference of extremely short finite length to permit the application of a circumscribing label to the periphery of a cylindrical container. Each of the backing members 50 is provided with an angular terminal portion 50' to which is attached a label pad 60 in the form of a thin membrane and affording a label supporting face 63. The terminal portion 50' affords a plane surface of reference 53, which is quite limited in length. Since the angular portions 50', shown diagrammatically in horizontal transverse section, are in contact with the cylindrical periphery, as shown in FIG. 14, the plane surface of reference 53 of each member 50 is equal to that portion of a plane in contact with the cylindrical periphery and tangent thereto at the area immediately underlying the plane surface of reference 53, when in a label applying position. FIG 13 illustrates, in solid lines, a container 92 and the label pad 60 before relative movement therebetween sufficient to effect application of the label to the container periphery and conformance of the label pad thereto. The container position following such relative movement is shown in dash lines. The pad is shown in solid lines in FIG. 14 in a label applying position wherein the label substantially circumscribes the container. The pivotal axes for each of the backing members 50 is located at the intersection of the loci A–A' and B–B'; the loci are determined as set forth above in conjunction with FIGS. 10, 11 and 12 to effect precise location of the axes.

Accordingly, a label applicator head so constructed is capable of applying a label to a container of given configuration without permitting any slippage or relative movement between the container and the label, once initial contact therebetween has been effected as the result of rectilinear relative movement toward each other. By referring to FIGS. 6 through 14, it can be seen that the invention contemplates construction of a variety of label applicator heads, each being particularly adaptable to a given container configuration, label length and range of relative movement between container and label pad.

FIG. 15 illustrates schematically a pair of label applicator heads supported on the same carrier mast CM and adapted simultaneously to apply to separate labels on respective label receiving surfaces afforded by the bottle 92. The applicator head shown in the lower location incorporates a frame 10, although not shown in detail, a carriage 15, slide arms 16, backing members 50 and a label pad 60. The structural details are shown in FIGS. 1–5. Although the closed-cell material 62 of the label applying pad 60 affords a satisfactory label receiving face, in actual practice, it has been found to be advantageous to bond a sheet 68 of flexible impervious material, such as a membrane of sheet rubber, to the closed-cell material 62 of the pad 60. Accordingly, the sheet 68 then serves as the element affording the label receiving face 63. The pneumatic conduits formed by the passageways 65 terminate in ports 66 which are exposed to the label 90.

The pneumatic system insures selective maintenance of the label 90 on the surface 63 so long as a differential air pressure exists on the opposite sides of the label. The configuration of the sheet 68 is formed to accommodate a particular label, and the sheet 68 is dimenisoned at a slightly smaller size than the label, as indicated in FIG. 15. This smaller dimension prevents the deposition of adhesive on the label receiving face 63 of the pad 60 upon contact between the exposed side of the label 90 and the particular means employed to apply adhesive thereto. It is to be understood that each particular form of label pad ideally is of such a configuration relative to a particular label so as to provide a margin of clearance about the periphery of the label and between the label pad and the label activating means, such as an adhesive applicator, not shown.

The applicator head shown in the upper location likewise incorporates similar structural details which are not illustrated in FIG. 15, however, FIGS. 17 and 18 supply sufficient detail to comprehend the structure. The upper applicator head is adapted to apply a label 190 to the sloping, generally coincal shoulder of the bottle 92 affording a surface 95; such a label has been termed a shoulder label. The upper head is carried on the carrier mast CM by means of a pivot pin 100 to permit limited pivotal movement about an axis substantially parallel to a label receiving face 163 afforded by lable pad 160 when in a label receiving position. The axis of pivot pin 100 is also substantially normal to the path of relative rectilinear movement between the pad 160 and the bottle 92.

A first cam, indicated at 101, is disposed at an appropriate location and is formed with a profile to contact follower 102 thereby to effect rocking movement of the upper head about pivot pin 100 and dispose the pad 160 in a plane substantially normal to the path of relative movement 188 between the bottle and the pad. A second cam 103 is disposed in a suitable location and is of a profile to cause such relative movement upon contact with a follower, the details of which are not shown. The pivotal axes of the backing members, not shown in detail in FIG. 15 but which conform to members 50 previously described, are disposed in respective planes substantially parallel to the respective gradient or element of peripheral surface adjacent to each of the axes when the pad is in a label applying position. The pivotal axes are located in a manner generally corresponding to the procedure described in detail in connection with the diagrammatic illustration of FIG. 10. The precise manner of locating the pivotal axes will be described subsequently.

The lower applicator is likewise associated with a cam, such as 37 described above, to effect, simultaneously with movement of the upper head, relative rectilinear movement between the pad and the bottle, the path of such movement being substantially normal to the gradient or increment of peripheral surface underlying the intermediate point of the label pad when in a label applying position. Accordingly, a label applicator having a pair of label pads is provided which is capable of simultaneously applying respective labels to a pair of label receiving surfaces disposed about an axis of reference of a single container by reason of travel of the pads along respective paths of rectilinear movement relative to the container, even though the surfaces are not parallel to each other and do not permit parallel paths of travel for the pads. In the case of both pads, the path of relative movement is substantially normal to the gradient or increment of peripheral surface underlying the intermediate point of the label pad when in a label applying position.

It will be appreciated that the procedure for locating the pivotal axes of label pad backing members, such as those indicated at 50 in FIGS. 1–14, can be performed by laying out the relative positions of the label pad, the target container, or bottle, and the label end points. These relative positions have been laid out in FIGS. 6 through 14 in a plane substantially normal to the respective longitudinal axis of each container, since the configuration of all of the containers has been in the form of either right cylinders or regular prisms, such as the containers of FIGS. 8 and 9, the latter having a cross-sectional configuration in the form of a pentagon. Accordingly, when locating the pivotal axes for each of the backing members 50 employed in label applying heads adapted to affix a label to containers of such regular configuration, a single plane of reference normal to the longitudinal axis of the respective container is used to lay out the said relative positions, such as those shown in FIGS. 6 through 14. This is true since each of these pivotal axes is substantially parallel to the longitudinal axis of its respective container, and, regardless of the number of planes parallel to the first lay out plane and overlying each other to permit the laying out of other points along the length of each respective pivotal axis, all of such other points would coincide in a composite, overlying view containing all of such lay out planes for a given single container. However, in locating the pivotal axes for the backing members of a pad adapted to apply a label to a target container affording a label receiving surface of a configuration other than a right cylinder or a regular prism, it will be found that such pivotal axes are not necessarily parallel to the longitudinal axis of a given target container. This is true, notwithstanding the fact that such label receiving surface is generated symmetrically about the longitudinal axis of the target container, as in the case of a right-circular cone. The surface may also be elliptical in cross-section as well as being tapered from top to bottom, as in a conical configuration. In such cases, the pivotal axes of the label pad backing members will generally lie in planes parallel to the gradient or element of label receiving surface of the target container, such gradient or element being adjacent to and immediately underlying a respective one of the pivotal axes when the label applying head is in a label applying position. Nevertheless, it has been found to be desirable to locate such pivotal axes by employing the procedure followed as described above in conjunction with FIGS. 10, 11, and 12, but to use at least two parallel lay out planes substantially normal to the gradient or element of label receiving surface contained in a radial plane in which lies the path of relative movement between the pad and the container. The path of such relative movement will be considered as being contained in a radial plane projected from the longitudinal axis of the target container. Stated otherwise, the parallel lay out planes of reference are normal to both a radial plane containing the path of relative movement and the element of surface in said radial plane, as well as being normal to said element of surface.

Referring specifically to FIGS. 15 and 16, the parallel reference planes used to lay out the various critical points in locating the pivotal axes of the label pad backing members are parallel to the path of relative movement and substantially normal to the gradient or element of surface lying in a radial plane and containing the path of relative movement between the label pad and the target container.

In FIG. 17, the structural elements are shown of a label pad which is specifically adapted to apply a shoulder label to the bottle 92 affording a label receiving surface 95 in a configuration of a frustum of a right-circular cone. It is to be noted that the shoulder label 190 to be applied to that label receiving surface is substantially of crescent form, as illustrated in dashed lines in FIG. 18, but must be urged into contact with the frusto-conical surface 95 of the bottle which accentuates the curve of the crescent and greatly changes the configuration of the label from the flattened condition when supported on the label pad. The structure, adapted to urge the label 190 into intimate contact with the frusto-conical surface 95 without causing any slippage between the label and the surface nor smearing of any adhesive thereon, includes a support frame fragmentarily illustrated at 110 in FIGS. 17 and 18. The frame is elevationally positioned on the carrier mast CM by the pivot pin 100, illustrated in FIG. 15. The structural details of the label applying head shown in FIGS. 17 and 18 correspond substantially to those illustrated in greater detail in FIGS. 1 through 5. Accordingly, only brief mention will be made of certain of the structural elements.

The frame 110 affords longitudinally extended bearing surfaces 114 to permit reciprocation of a carriage 115 along a path of relative movement, indicated at 188. The carriage 115 includes two laterally opposed slide arms 116 disposed on opposite sides of the path of relative movement 188. A cam follower 131 is supported in the carriage and adapted to be contacted by a cam 103 to reciprocate the carriage from a label receiving position, shown in FIG. 17, to a label applying position.

Two laterally opposed backing members 150 are supported for individual pivotal movement by respective pivot pins 151, each mounted in a respective one of the slide arms 116. The pins 151 provide the pivotal axes for the backing members 150, the location of such axes being extremely critical to satisfy operation of the label applying head. The procedure for such location will be described in detail in connection with FIG. 16. Each of the backing members 150 provides a respective plane surface of reference 153.

A flexible, resiliently compressible air impervious label receiving pad 160 is mounted on the backing members 150 in interconnecting relationship therebetween and normally urges the members into coplanar relationship when the carriage 115 is in a label receiving position. The pad 160 includes an impermeable sheet 161 of pliable material, such as sheet rubber bonded to each of the backing members 150. A closed-cell elastomer material 162, such as sponge rubber, is adhered to the impermeable sheet 161 to render the pad resiliently compressible. A label supporting face 163 is provide in the pad by an impermeable layer of pliable material 168, such as a thin membrane of sheet rubber, and provides dimensional stability to the pad thereby to render it substantially non-elastic, both longitudinally and laterally of the face 163. To prevent deposition of adhesive on the pad 160, the configuration of the label supporting face 163 is dimensioned slightly smaller than that of the shoulder label 190. As in the other forms of label applying pads, pneumatic passageways 165 are provided in the pad 160 and communicate with tubular conduits 164 extended from the backing members 150. A pair of hoses 167 completes the communication between the label supporting face 163 and a suitable source of vacuum, not shown. Accordingly, differential pneumatic pressure on opposite sides of the label 190 insures maintenance of the label on the face 163, so long as the differential exists.

A backing block 170 affords a plane surface 171, and in conjunction with the plane surfaces 153 maintains the pad 160 in a flattened condition when in a label receiving position. A push rod 172 is secured to the backing block 170 and is supported for reciprocation relative to the carriage 115 by a suitable bore provided in a bearing block 176. A biasing spring 180 is mounted on the rod 172 and bears against the carriage 115 to urge the backing block 170 to an extended position.

Referring again to FIG. 16, two parallel planes of lay out reference are selected to show the outline configuration of the label receiving surface of a target container such as bottle 92, in those planes. FIG. 16 is drawn at a scale substantially twice that used in FIGS. 15 and 17. The location of the planes of reference lay outs are shown in FIG. 15, it being understood that the planes are to be selected on a side opposite from that actually shown, i.e. on the same side as the upper label applying head. These planes are illustrated in FIG. 15 on an opposite side, merely for purposes of clarity. Two spaced parallel planes substantially normal to the gradient or element of surface contained in the radial plane in which the path of relative movement 188 lies, have been selected to show any deviation of the pivotal axes provided by the pins 151 from a location precisely parallel to respective elements of surface underlying and adjacent to the pivotal axes, when the pad 160 is in a label applying position. The pivotal axes of the backing members of any pad constructed in accordance with the principles of the present invention will generally lie in a plane parallel to such gradient or element of surface. However, the location of these pivotal axes may be defined in another manner by reference to FIG. 16.

As in the diagrammatic lay outs of FIGS. 10, 11, and 12, the outline configuration of the target container is shown in the reference lay out plan in dashed lines to indicate its position before relative movement between the label applying pad 160 and the target container. The label as well as the label supporting face 163 of the label pad 160 is shown in full lines prior to any such relative movement. The container is also shown in full lines after such relative movement. Legends similar to those employed in FIGS. 10, 11 and 12 are also used in FIG. 16 to denote corresponding portions of the structure, selected points on the label 190 and the outline of the label receiving surface 195, the path of relative movement 188, and other items which have a critical bearing on the location of the pivotal axes. As in FIGS. 10, 11 and 12, only those critical items relating to one of the pivotal axes of pins 151 have been illustrated. Since the label receiving surface 195 afforded by the bottle 92 is symmetrically generated about the longitudinal axis of the bottle, the other of such pivotal axes will be located in the same manner and in a corresponding position on the opposite side of the path of relative movement 188.

In each of the upper and lower planes of lay out reference employed in forming the composite diagrammatic illustration of FIG. 16, an intermediate point O is indicated on the label 190, both in a position of attachment to the label receiving surface of the bottle 92 as well as when supported in a single plane by the label receiving face 163 of the pad 160. The label end points in those respective planes are indicated by the reference characters A and X. The term "label end points" is construed to mean the effective end point in the plane of reference used to determine the pivotal axis of a backing member, and may not necessarily coincide with the physical end or limit of a given label.

The container 92 is shown in dashed lines in a position prior to relative movement between the label pad 160 and the container; to determine the location of the pivotal axes of the pins 151, the container is then moved diagrammatically relative to the label, the range of movement being sufficient to urge the label into conforming contact with the container 92. As illustrated in FIGS. 10, 11 and 12, this range of movement can be varied to suit peculiar operating limitations, however, the range of movement is generally approximately equal to the projected length of the label when in an applied position. Following such relative movement of sufficient range, the label end points A' and X' must necessarily overlie a corresponding point of the label receiving surface 195; consequently, a single symbol will suffice for each pair of the overlying points of the label and the label receiving surface. Corresponding label end points of the label when supported on the face 163 in a planar condition are indicated by the letters A and X. The locus of points is then determined equidistant from a respective one of the end points of the label in one of the reference planes and supported on the label receiving pad when the container is located relative to the label applying head with the arms 116 in an extended label applying position and the pad is in a conforming configuration to the label receiving surface 95 of the container 92, and the same end point of the label in a location when the pad 160 is in a plane label receiving configuration with the arms 116 moved to a retracted label receiving position. In FIG. 16, this locus of points is labeled Locus A–A', and represents the locus of points in the upper reference lay out plane equidistant from the end point A' of the label in an applied position and the end point A of that same label when the pad is in a plane label receiving configuration. A second locus of points is then determined in the same upper reference plane which is a locus equidistant from a pair of arbitrarily located points using the points A and A' as reference points and the plane of surface 153 as a plane surface of reference when the apparatus is both in a label receiving position as well as a label applying position. A plane is extended substantially parallel to that portion of the plane surface 153 lying in the upper reference plane when in a label applying position, the extended plane being tangent to the label receiving surface 95 of the bottle 92 at the end point A'. The first arbitrary point is indicated by the letter B and is spaced at a predetermined rectilinear distance in a predetermined direction, which in FIG. 16, is intermediate the label end point A and the intermediate point O. The second arbitrary point indicated at B' is spaced from that same end point of the label when it is in contact with the container 92 and the pad 160 is in a label applying position. The spacing of the second arbitrary point B' from the label end point A' is also of the same predetermined rectilinear distance and in the same direction, i.e. intermediate the label end point A and point O. A second condition which must be satisfied by the second arbitrary point B' is that it must lie in a plane substantially parallel to the plane surface of reference 153 of the respective backing member 150 adjacent to that same label and point A' when the backing member 150 is in a label applying position. Stated differently, the arbitrary point B' must be in a plane tangent to the label receiving surface 95 at the label end point A' in an applied position. The locus of points equidistant between the arbitrary points B and B' is indicated in FIG. 16 by the legend Locus B–B'. It will be noted that the locus A–A' and the locus B–B' intersect in the upper reference lay out plane and thereby determine the location of a point along the pivotal axis of a pin 151 in that upper reference plane.

In like manner, another point along the pivotal axis of the pin 151 is located in the lower reference plane. Corresponding label end points, both in a flattened condition supported on the label pad 160 and a conforming configuration applied to the label receiving surface are indicated in such lower reference plane by the reference letters X and X', respectively. Arbitrary points corresponding to B and B' in the upper reference plane are indicated in the lower reference plane by the points Y and Y'. The locus of points equidistant between X and X' and the locus of points equidistant between the arbitrary points Y and Y' are then determined in the lower reference plane. The intersection of the loci X–X' and Y–Y' then determines the point in the lower reference plane along the pivotal axis of the pin 151. The relative location of these points in their respective lay out planes then determines the true location of the pivotal axis of each of the pivot pins 151 and their inclination, if any, relative to the longitudinal axis of the container 92. The corresponding pivotal axis on the opposite side of the path of relative movement 188 is determined in an identical manner.

As can be clearly seen in FIGS. 17 and 18, the pivotal axes afforded by the pins 151 for the backing members 150 depart substantially from a condition parallel to the axis of the bottle 92. However, when in a label applying position, each pivotal axis lies in a respective plane substantially parallel to a respective gradient or element of label receiving surface immediately underlying and adjacent to said axis.

Referring to FIGS. 19, 20 and 21, label applying apparatus is illustrated as being specifically adapted partially to affix a label having a length greater than the peripheral extent of the label receiving surface afforded by the bottle 92 and known as a "wrap-around" label. Since the structure is substantially identical in design to the label applying head shown in FIGS. 17 and 18 as well as FIGS. 1 through 5, only brief mention will be made of several of the elements. A carriage 215 is provided and includes a pair of laterally opposed backing members 250 pivotally supported by means of respective pins 251. A pad 260 interconnects the backing members and includes an impervious sheet 261 bonded to the members. A resilient compressible layer of sponge rubber 262 is adhered to the sheet 261 and partially covered by an outer sheet 268 of rubber or like material. The outer sheet affords a label supporting surface 263 on which is shown a label 290 of the wrap-around type.

The wrap-around label 290 is adapted to encircle the generally conical neck of the bottle 92 in slightly overlapping relationship. The label applying pad 260 is adapted to affix the label to the conical neck only throughout a predetermined length of the label. The remainder of the label is subsequently to be urged into contact with the bottle by a manual method or suitable label depressors, such as that illustrated in my previously mentioned co-pending application Serial No. 260,801 entitled Label Applying Machine.

It is to be noted that the slope of the conical surface shown in FIG. 20 is of relative slight degree as compared to the frusto-conical surface afforded by the shoulder of the bottle, as illustrated in FIG. 15. Therefore, substantial coincidence of location of the pivotal axes of the pins 251 will occur whether the reference lay out planes are normal to the longitudinal axis of the bottle or substantially normal to the gradient or element of surface lying in a radial plane and containing the path of relative movement between the pad 260 and the bottle 92. The composite diagrammatic illustration in FIG. 19 employs elevationally spaced parallel reference planes of lay out which are normal to the axis of the bottle. In a manner substantially identical to that described above in connection with FIG. 16, label end points A and X are located in each of the respective upper and lower reference planes. Also, corresponding arbitrary points B and Y are located in these same reference planes. By illustrating the label in a flattened condition supported on the face 263 of the pad 260 when in a label receiving position and also illustrating the label receiving surface of the bottle 92 in a position following relative movement between the bottle and the pad 260 to effect movement of the pad to a label applying position, the respective loci of points equidistant between A and A', B and B', X and X', and Y and Y' are then located in the respective reference planes and their intersections noted. This same procedure is performed for the pivot pins 251 on both sides of the path of relative movement. Accordingly, points along the pivotal axes are then determined in each plane which determines the inclination of each axis relative to the label receiving surface of the bottle 92.

Accordingly, it will be observed that the present invention provides label applying apparatus which is readily adapted to a variety of container configurations, each of them affording a respective label applying peripheral surface disposed about a central axis. So long as the apparatus incorporates the structure described above, and includes pivotal axes for the backing members of the label applying pad and such axes are precisely located in accordance with the procedure described, the apparatus is capable of applying a label to such peripheral surface and urging the label into intimate conforming contact with such a surface merely as a result of relative rectilinear movement between the pad and the container along a path substantially normal to the gradient or element of surface lying in a radial plane of the container and containing the path of relative movement.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a labeling machine adapted to apply a label to a predetermined label receiving surface disposed symmetrically about an axis of reference, a label applying head comprising a bracket, means mounting the bracket for movement between predetermined extended label applying position and retracted label receiving position, a pair of spaced backing plates, means individually pivotally mounting the plates on the bracket for movement about respective axes, said axes being disposed in a common plane and being individually disposed in planes common to the axis of reference of the label receiving surface when the bracket is in extended position, and a flexible label receiving pad mounted on the plates in interconnecting relation therebetween.

2. The label applying head of claim 1 in which the pad is resiliently compressible and substantially air impervious and including conduit means borne by the bracket and communicating through the pad, and means for applying vacuum to the conduit means when the bracket is retracted to hold a label on the pad and to release the vacuum when the bracket is inextended position.

3. The label applying head of claim 1 including means borne by the bracket resiliently urging the plates into coplanar relation.

4. A label applying head comprising a resiliently flexible pad having opposite end edges, a predetermined retracted label receiving position in which the pad is substantially flat and disposed in a predetermined plane and a predetermined extended label applying position with the pad arcuately conformed between its end edges about a label receiving surface disposed about an axis of reference, the end edges of the pad being more closely spaced in the label applying position than in the label receiving position; a backing plate mounted on the pad adjacent to each of the end edges thereof; a bracket; a pivot pin individual to each backing plate pivotally mounting its respective plate on the bracket in fixed spaced relation, the pins being disposed in a common plane and individually being disposed in planes common to the axis of the label applying surface when the pad is in extended position; and means connected to the bracket reciprocating the bracket between positions successively disposing the pad in said extended and retracted positions.

5. A label applying head comprising a resiliently flexible pad having opposite end edges, a predetermined retracted label receiving position in which the pad is substantially flat and disposed in a predetermined plane and a predetermined extended label applying position with the pad arcuately conformed between its end edges about a label receiving surface disposed about an axis of reference, the end edges of the pad being more closely spaced in the label applying position than in the label receiving position; a backing plate mounted on the pad adjacent to each of the end edges thereof; a bracket; a pivot pin individual to each backing plate pivotally mounting its respective plate on the bracket in fixed spaced relation, the pins being disposed in a common plane and individually being disposed in planes common to the axis of the label applying surface when the pad is in extended position; and means connected to the bracket reciprocating the bracket between positions successively disposing the pad in said extended and retracted positions whereby the backing plates are pivoted and the respective portions of the pad mounted thereon are carried through predetermined arcs as the pad is successively alternately arcuately conformed to said surface and flattened, the total arcuate travel of said pad portions projected on the plane of the pins being substantially equal to the difference in spacing of the end edges of the pad in said retracted and extended positions.

6. In a labeling machine adapted to apply a label to a predetermined label receiving surface disposed symmetrically about an axis of reference, a label applying head comprising a bracket; means mounting the bracket for movement between predetermined extended label applying position and retracted label receiving position; a pair of spaced backing plates; means individually pivotally mounting the plates on the bracket for movement about respective axes, said axes being disposed in a common plane and being individually disposed in planes common to the axis of reference of the label receiving surface when the bracket is in extended position; a flexible, resiliently compressible, non-elastic, air impervious label receiving pad mounted on the plates in interconnecting relation therebetween and urging the plates into coplanar relation; an auxiliary backing plate mounted on the bracket between the spaced backing plates disposed in coplanar relation with the spaced backing plates when the bracket is retracted; conduit means borne by the bracket and communicating through the pad; a source of vacuum connected to the conduit means; and valve means connecting the conduit means to the vacuum source when the bracket is retracted to hold a label on the pad and releasing the vacuum to release the label when the bracket is extended.

7. A label applying head comprising a resiliently flexible pad having a label receiving surface, opposite end edges, a predetermined retracted label receiving position in which the label receiving surface is disposed in a substantially flat plane and a predetermined extended label applying position with the label receiving surface arcuately conformed between the end edges of the pad about a label receiving surface having gradient lines of reference, the end edges of the pad being more closely spaced in the label applying position than in the label receiving position; a pair of spaced backing plates individually mounting the pad adjacent to the end edges thereof; a bracket; a pivot pin individual to each backing plate pivotally mounting its respective plate on the bracket, the pins being disposed in a common plane in fixed spaced relation and individually being parallel to their respective most closely adjacent gradients of the label receiving surface when the pad is in extended position; and means connected to the bracket reciprocating the bracket between positions successively disposing the pad in its said extended and retracted positions whereby the backing plates are pivoted and the respective portions of the pad mounted thereon are carried through predetermined arcs as the pad is successively arcuately conformed to the label receiving surface and flattened, the radial distance of the label applying surface of the pad from each of the pivot pins being such that when the backing plates are pivoted through said predetermined arcs, points on the label applying surface of the pad lying in the individual planes of the pivot pins are moved toward each other a distance substantially equal to the difference in spacing of the end edges of the pad in extended and retracted positions.

8. A label applying head comprising a resiliently flexible pad having a label receiving surface, opposite end edges, a predetermined retracted label receiving position in which the label receiving surface is disposed in a substantially flat plane and a predetermined extended label applying position with the label receiving surface arcuately conformed between the end edges of the pad about a label receiving surface having gradient lines of reference symmetrically disposed about an axis of reference, the end edges of the pad being more closely spaced in the label applying position than in the label receiving position; a pair of spaced backing plates individually mounting the pad adjacent to the end edges thereof; a bracket; a pivot pin individual to each backing plate pivotally mounting its respective plate on the bracket, the pins being disposed in fixed spaced relation in a common plane and individually being disposed in radially extended planes common to the reference axis and parallel to gradient lines of reference in their respective planes when the pad is in extended position; means connected to the bracket reciprocating the bracket between positions successively disposing the pad in its said extended and retracted positions whereby the backing plates are pivoted and the respectice portions of the pad mounted thereon are carried through predetermined arcs as the pad is successively arcuately conformed to the label receiving surface and flattened, the radial distance of the label applying surface of the pad from each of the pivot pins being such that when the backing plates are pivoted through said predetermined arcs, points on the label applying surface of the pad lying in the individual planes of the pivot pins are moved toward each other a distance substantially equal to the difference in spacing of the end edges of the pad in extended and retracted positions; conduit means communicating through the pad; a source of vacuum connected to the conduit means; and valve means connecting the conduit means to the vacuum source when the bracket is retracted to hold a label on the pad and releasing the vacuum to release the label when the bracket is extended.

9. A head, adapted to apply labels to a surface symmetrically disposed about an axis of reference, comprising a bracket; means mounting the bracket for reciprocal movement toward and from said surface between predetermined label receiving and label applying positions; a pair of spaced plates; means mounting the plates on the bracket for pivotal movement about axes in fixed spaced relation between coplanar label receiving positions and pivoted label applying positions, said axes being disposed in a common plane and individually disposed in planes common to the axis and radial thereof when the bracket is in applying position; a flexible resiliently compressible pad having opposite ends, mounted flatly against the plates in interconnecting relation therebetween, and having a label receiving face conformed to the label receiving surface when the bracket is in applying position, the opposite ends of the pad being in predetermined closer proximity when the pad is conformed to the label receiving surface than when the plates are in coplanar relation, the spacing of the pivotal axes being such that when the pad is conformed to the label receiving surface the plates are substantially normal to lines radially extended from the reference axis centrally through said plates, the face of the pad being spaced from said pivotal axis a distance such that points on the receiving face of the pad adjacent to each plate are in predetermined closer proximity when the pad is conformed to the receiving surface a distance substantially equal to the closer proximity of the opposite ends of the pad when the pad is in label applying position as compared with the spacing of said ends when the pad is in label applying position whereby the face of the pad is of substantially constant length when the plates are coplanar and during pivotal movement thereof.

10. In a labeling apparatus adapted simultaneously to apply a pair of labels to respective label receiving surfaces which are disposed symmetrically on a single article about a common axis of reference but which surfaces are angularly related longitudinally of the axis, a label applying head comprising a frame; a first bracket mounted on the frame for reciprocal movement toward and from one of said surfaces; a second bracket; means mounting the second bracket on the frame for reciprocal movement toward and from the other label receiving surface; drive means operatively associated with the brackets concurrently and correspondingly to reciprocate said brackets between predetermined extended label applying positions and retracted positions; a pair of spaced backing plates individual to each bracket; means individually pivotally mounting the plates on their respective brackets for movement about individual axes, said axes for the plates of each bracket being disposed in a common plane individual to their bracket, the axes being individually parallel to the adjacent portion of their respective label receiving surfaces of the article when their brackets are in respective extended positions, and being also individually disposed in planes common to the reference axis of the label receiving surface when their brackets are in respective extended positions; a flexible label receiving pad mounted on the plates of each bracket in interconnecting relation between their respective plates and urging their plates into coplanar relation, said pads benig adapted to conform to their respective label receiving surfaces of the article upon being pressed thereagainst, the means mounting the second bracket being pivotal between a first position with its respective pad disposed in the plane of the other pad when both brackets are retracted and being parallel to its respective label receiving surface when its bracket is extended, said second bracket being resistively urged into said first position; and means connected to the second bracket pivoting the second bracket to its second position for movement of the second bracket to its extended position to apply a label and releasing the second bracket for return to its first position in retracted position with its pad disposed in the plane of the pad of the first bracket when the brackets are retracted for label and glue receiving purposes.

11. The label applying head of claim 10 in which the pads are resiliently compressible and substantially air impervious; including conduit means borne by each of the brackets and communicating through their respective pads; and means for applying vacuum to the conduit means when the brackets are retracted to hold labels thereon and to release the vacuum and said labels when the brackets are in their extended positions.

12. In a labeling apparatus adapted simultaneously to apply a pair of labels to respective label receiving surfaces which are disposed symmetrically about a common axis of reference, one of said surfaces being substantially parallel to the axis and the other surface being angularly related to the axis, a label applying head comprising a frame; a first bracket mounted on the frame for reciprocal movement toward and from said one surface in a rectilinear path in substantially right-angular relation thereto between predetermined retracted label receiving and extended label applying positions; a second bracket; means mounting the second bracket on the frame for reciprocal movement toward and from said other surface in a rectilinear path between predetermined retracted label receiving and extended label applying positions and pivotal between a position with said path parallel to the path of the first bracket and a position with said path right-angularly related to said other surface, said second bracket being urged into its position having its path parallel to that of the first bracket; a pair of spaced backing places individual to each bracket; means mounting the plates on their respective brackets for pivotal movement about axes in fixed spaced relation between predetermined coplanar label receiving positions and pivoted label applying positions, said axes for the plates of each bracket being disposed in a common plane and when their respective brackets are extended in right angular relation to their respective surfaces the axes being individually disposed in planes common to the axis of reference and radial thereof; a flexible resiliently compressible pad having opposite ends mounted flatly against the plates of each pair in interconnecting relation therebetween, resiliently urging their respective plates into coplanar relation, and having a label receiving face conformed to their respective label receiving surfaces when their brackets are in applying position, the opposite ends of the pads being in predetermined closer proximity when the pads are conformed to their respective label receiving surfaces than when in coplanar relation, the spacing of the pivotal axis of each pair of plates being such that when their respective pad is conformed to its label receiving surface the plates are substantially normal to lines radially extended from the reference axis centrally through said plates and the faces of the pads being spaced from their respective pivotal axes distances such that points on the receiving faces of the pads lying on said central radial lines are in said predetermined closer proximity when their pad is conformed to its receiving surface than when in label receiving position; means operatively associated with the brackets concurrently and correspondingly to reciprocate said brackets between extended and retracted positions; and means connected to the second bracket adapted to pivot said second bracket to its position with its path right-angularly related to its respective label receiving surface synchronous with movement of the second bracket toward said surface and releasing the second bracket for return of its path to parallelism with the path of the other bracket upon retraction from its respective surface, the label receiving surfaces of the pads being disposed in a substantially common plane when their respective brackets are retracted.

13. The label applying head of claim 12 in which the pads are resiliently compressible and substantially air impervious; including conduit means borne by each of the brackets and communicating through their respective pads, and means for applying vacuum to the conduit means when the brackets are retracted to hold labels thereon and to release the vacuum and said labels when the brackets are in their extended positions.

14. In a labeling machine adapted to apply a label of pliable material to a container having a label receiving surface disposed about an axis of reference, said surface affording an element and having a predetermined intermediate point on the surface through which passes a radial plane extending from and containing said axis, the surface having opposite end points lying in a reference plane normal to both said radial plane and said element, and each end point being located a respective predetermined peripheral distance from said intermediate point, a label applying head comprising a frame; a pair of laterally opposed support arms; means mounting the arms in the frame for synchronized rectilinear movement of a predetermined range along respective spaced paths substantially parallel to said radial plane between predetermined extended label applying and retracted label receiving positions; a pair of laterally spaced backing members affording respective plane surfaces arranged substantially coplanar when in said retracted label receiving position; a flexible label receiving pad mounted on the backing members in interconnecting relation therebetween, the pad being adapted to conform to said label receiving surface and having an intermediate point and corresponding end points located so as to overlie the respective corresponding points on said surface when the arms are extended to a label applying position, the pad being in a substantially plane configuartion when the arms are retracted to a label receiving position; and means mounting the backing members on their respective arms for pivotal movement about axes in fixed spaced relation, each of said axes being located at the intersection of a respective pair of loci of points lying in said reference plane, the first of each pair of loci being a locus of points equidistant from a respective one of the end points of the label receiving pad when the container is located relative to the label applying head with the arms in an extended label applying position and the pad in conforming configuration to the label receiving surface and the same end point of said label pad in a location when the pad is in a plane label receiving configuration with the arms moved to an extended label applying position in the absence of a container proximate to the pad, and the second of each pair of loci being a locus of points equidistant from a pair of arbitrarily located points, the first arbitrary point being spaced at a predetermined rectilinear distance in a predetermined direction from said respective one of the end points of the label pad when in a label receiving configuration, the second arbitrary point being spaced from said end point of the label pad when in a label applying position, the spacing being at a distance equal to said predetermined distance and in the same direction as said predetermined direction relative to said end point, the second arbitrary point lying in a plane parallel to the plane surface of the respective backing member adjacent said label end point when in a label applying position.

15. In a labeling machine adapted to apply a label of pliable material to a container having a label receiving surface disposed about an axis of reference, said surface affording an element and having a predetermined intermediate point on the surface through which passes a radial plane extending from and containing said axis, the surface having opposite end points lying in a reference plane normal to both said radial plane and said element and each end point being located a respective predetermined peripheral distance from said intermediate point, a label applying head comprising a frame; a pair of laterally opposed support arms; means mounting the arms in the frame for synchronized rectilinear movement of a predetermined range along respective spaced paths substantially parallel to said radial plane between predetermined extended label applying and retracted label receiving positions; a pair of laterally spaced backing members affording respective plane surfaces of reference arranged substantially coplanar when in said retracted label receiving position; a flexible label receiving pad mounted on the backing members in interconnecting relation therebetween, the pad being adapted to conform to said label receiving surface and having an intermediate point and corresponding end points located so as to overlie the respective corresponding points on said surface when the arms are extended to a label applying position, the pad being in a substantially plane configuration when the arms are retracted to a label receiving position; and means mounting the backing members on their respective arms for pivotal movement about axes in fixed spaced relation, each of said axes being located at the intersection of a respective pair of loci of points lying in said reference plane, the first of each pair of loci being a locus of points equidistant from a respective one of the end points of the label supported on the label receiving pad when the container is located relative to the label applying head with the arms in an extended label applying position and the pad in conforming configuration to the label receiving surface and the same end point of said label in a location when the pad is in a plane label receiving configuration with the arms moved to a retracted label receiving position, and the second of each pair of loci being a locus of points equidistant from a pair of arbitrarily located points, the first arbitrary point being spaced at a predetermined rectilinear distance in a predetermined direction from said respective one of the end points of the label supported on the pad when in a label receiving configuration, the second arbitrary point being spaced from said end point of the label in intimate contact with the container when the pad is in label applying position, the spacing being at a distance equal to said predetermined distance and in the same direction as said predetermined direction relative to said end point, the second arbitrary point lying in a plane parallel to the plane surface of reference of the respective backing member adjacent said label end point when in a label applying position; and means to effect relative movement of said arms and container toward and away from each other to apply a label to said label receiving surface and to move the pad to a retracted label receiving position.

16. In a labeling machine adapted to apply a label of pliable material to a container having a pair of label receiving surfaces disposed about an axis of reference, each of said surfaces affording a respective element, each having a predetermined intermediate point through which passes a radial plane extending from and containing said axis, each surface also having opposite end points lying in a respective reference plane normal to both said radial plane and its respective surface element, each end point being located a respective predetermined peripheral distance from said intermediate point, a label applying apparatus comprising a pair of applying heads, each of the heads having a frame, a pair of laterally spaced backing members affording respective substantially plane surfaces of reference arranged substantially coplanar when in a retracted label receiving position; means supporting the backing members for synchronized rectilinear movement of a predetermined range along respective paths substantially parallel to said radial plane between predetermined extended label applying and retracted label receiving positions and including means mounting the members for pivotal movement about respective axes in fixed spaced relation; and a flexible label receiving pad mounted on the backing members in interconnecting relation therebetween, the pad being adapted to conform to said label receiving surface and having an intermediate point and corresponding end points located so as to overlie the respective corresponding points on said surface when the members are extended to a label applying position, the pad being in a substantially plane configuration when the members are retracted to a label receiving position; and means mounting the backing members on their respective members for pivotal movement about axes in fixed spaced relation, each of said axes being located at the intersection of a respective pair of loci of points lying in a respective reference plane for the label receiving surface of a respective one of said applying heads, the first of each pair of loci being a locus of points equidistant from a respective one of the end points of the label supported on the label receiving pad when the container is located relative to the label applying head with the members in an extended label applying position and the pad in conforming configuration to the label receiving surface and the same end point of said label in a location on the pad when the pad is in a plane label receiving configuration with the backing members moved to a retracted label receiving position, and the second of each pair of loci being a locus of points equidistant from a pair of arbitrarily located points, the first arbitrary point being spaced at a predetermined rectilinear distance in a predetermined direction from said respective one of the end points of the label supported on the pad when in a label receiving configuration, the second arbitrary point being spaced from said one of the end points of the label while in intimate contact with the container when the pad is in a label applying position, said second arbitrary point being spaced at a distance equal to said predetermined distance and in the same direction as said predetermined direction relative to said one end point, the second arbitrary point lying in a plane parallel to the plane surface of reference of the respective backing member adjacent said one label end point when in a label applying position; means supporting one of said applying heads subjacent the other; means mounting one of said applying heads for rocking movement about an axis substantially normal to its respective path of relative movement; cam and cam follower means operatively associated with said one of the applying heads to effect rocking movement thereof; and cam and cam follower means operatively associated with both of said applying heads to effect rectilinear movement of their respective backing members along their respective rectilinear paths of travel thereby simultaneously moving said pads to a label applying position.

17. In a labeling machine adapted to apply a label of pliable material to a container having a label receiving surface generated about an axis of reference, said surface affording an element and having a predetermined intermediate point on the surface through which passes a radial plane extending from and containing said axis, the surface having a plurality of laterally opposed pairs of end points, each pair lying in a respective plane substantially normal to both said element and a radial plane containing said element, each end point of a respective pair located a respective predetermined peripheral distance from said intermediate point, a label applying head comprising a frame; a pair of laterally opposed support arms; means mounting the arms in the frame for synchronized rectilinear movement of a predetermined range along respective spaced paths substantially parallel to said radial plane between predetermined extended label applying and retracted label receiving positions; a pair of laterally spaced backing members affording respective plane surfaces arranged substantially coplanar when in said retracted label receiving position; a flexible label receiving pad mounted on the backing members in interconnecting relation therebetween, the pad being adapted to conform to said label receiving surface and having an intermediate point and corresponding end points located so as to overlie the respective corresponding points on said surface when the arms are extended to a label applying position, the pad being in a substantially plane configuration when the arms are retracted to a label receiving position, and being adapted for movement with said backing members relative to the label receiving surface along a path of travel considered coincident with said radial plane passing through said intermediate point; and means mounting the backing members on their respective arms for pivotal movement about axes in fixed spaced relation, each of said axes having a plurality of points spaced longitudinally therealong and lying in respective parallel reference planes normal to both said element of surface and said radial plane containing said element of the label receiving surface in which lies the path of relative movement between said path and the container, each of said longitudinally spaced points along a respective pivotal axis being located in its respective reference plane at the intersection of a respective pair of loci of points, the first of each pair of loci being a locus of points equidistant from a respective one of the end points of the label receiving pad when the container is located relative to the label applying head with the arms in an extended label applying position and the pad in conforming configuration to the label receiving surface and from the same end point of said label pad in a location when the pad is in a plane label receiving configuration with the arms moved to an extended label applying position in the absence of a container proximate to the pad, and the second of each pair of loci being a locus of points equidistant from a pair of arbitrarily located points, the first arbitrary point being spaced at a predetermined rectilinear distance in a predetermined direction from said respective one of the end points of the label pad when in a label receiving configuration, the second arbitrary point lying in a plane tangent to said label receiving surface at said label end point in a label applying position, and being spaced therefrom at a distance equal to said predetermined distance and in the same direction as said predetermined direction relative to said end point.

18. The label applying head of claim 17 wherein said flexible label receiving pad affords a label receiving face and wherein said pad is resiliently compressible and substantially dimensionally stable both longitudinally and laterally relative to said face.

19. The label applying head of claim 18 wherein said label receiving face is of a configuration similar to said label but of a dimension smaller than said label thereby to provide a predetermined margin of peripheral clearance about said face relative to said label.

References Cited by the Examiner
UNITED STATES PATENTS

| | | | |
|---|---|---|---|
| 2,299,544 | 10/42 | Humphrey | 156—492 |
| 2,941,570 | 6/60 | Plym | 156—475 |
| 2,980,278 | 4/61 | Carter | 156—475 |
| 2,983,398 | 5/61 | Carter | 156—476 |

EARL M. BERGERT, *Primary Examiner.*